United States Patent
Ando et al.

(10) Patent No.: US 8,014,716 B2
(45) Date of Patent: Sep. 6, 2011

(54) INFORMATION MANAGEMENT SERVER AND INFORMATION DISTRIBUTION SYSTEM

(75) Inventors: Haru Ando, Kodaira (JP); Nobuhiro Sekimoto, Kokubunji (JP); Takashi Hasegawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 630 days.

(21) Appl. No.: 10/728,904

(22) Filed: Dec. 8, 2003

(65) Prior Publication Data

US 2004/0254983 A1 Dec. 16, 2004

(30) Foreign Application Priority Data

May 30, 2003 (JP) .................................. 2003-154517

(51) Int. Cl.
*G09B 3/00* (2006.01)
(52) U.S. Cl. ...................... 434/350; 434/322; 434/365
(58) Field of Classification Search .................. 434/118, 434/156–185, 219, 322–365; 704/251, 231; 707/3, 603, 706, 722–723, 725, 728, 748; 715/223, 229, 719; 382/181; 725/41, 46
See application file for complete search history.

(56) References Cited

U.S. PATENT DOCUMENTS

| | | | |
|---|---|---|---|
| 6,024,577 A | 2/2000 | Wadahama et al. | |
| 6,411,796 B1 * | 6/2002 | Remschel | 434/350 |
| 6,775,518 B2 * | 8/2004 | Norcott et al. | 434/350 |
| 7,050,753 B2 * | 5/2006 | Knutson | 434/350 |
| 2005/0216443 A1 * | 9/2005 | Morton et al. | 707/3 |
| 2006/0099562 A1 * | 5/2006 | Carlsson | 434/350 |
| 2006/0141441 A1 * | 6/2006 | Hutchinson et al. | 434/350 |

FOREIGN PATENT DOCUMENTS

| | | |
|---|---|---|
| JP | 9-62173 | 8/1995 |
| JP | 10-123923 | 10/1996 |
| JP | 11-249537 | 3/1998 |
| JP | 11-249540 | 3/1998 |
| JP | 2002-132127 | 10/2000 |
| JP | 2003-058036 | 8/2001 |

OTHER PUBLICATIONS

Office Action from the Japanese Patent Office dated Feb. 24, 2009 in Japanese.

(Continued)

*Primary Examiner* — Xuan M Thai
*Assistant Examiner* — Timothy Musselman
(74) *Attorney, Agent, or Firm* — Stites & Harbison PLLC; Juan Carlos A. Marquez, Esq.

(57) ABSTRACT

An information management server and information distribution system utilizes a video of the class for creating educational contents matching the learning conditions of the student, and also provides instruction using these same contents. This information server and information distribution system are composed of an accumulator section to store electronic data on the lecture contents, a holding section to hold lecture-related information, a send section to send lecture contents and lecture-related information to the terminal of the student, an analyzer section to analyze electronic data on the lecture contents, and a matcher section to link lecture-related information with lecture contents based on those analysis results, and a control section for selecting lecture contents linked to the lecture-related information based on a reply to the lecture-related information sent from the student terminal, wherein the send section and sends those selected lecture contents to the terminal of the student that sent the reply to the lecture-related information.

8 Claims, 17 Drawing Sheets

OTHER PUBLICATIONS

Yamamoto, Natsuo et al., "A Study on Lecture Video Structuring by Topic Segmentation", IPSG SIG Notes, Japan, Information Processing Society of Japan, Jul. 13, 2002, vol. 2002, No. 65 p. 59-64.

Katayama, Kaoru et al., "A Method for Searching Recorded Lectures in Distance Education", Transactions of Information Processing Society of Japan, Japan, Information Processing Society of Japan, Oct. 15, 1998, vol. 39, No. 10, p. 2837-2845.

Tsushima, Hideki et al., "Realtime Examination for Distance Learning", the 58$^{th}$ (19990309) National Convention of IPSJ Conference Transaction(4), Information Processing Society of Japan, Mar. 9, 1999, p. 4-339-4-340.

* cited by examiner

FIG.10

| TIME MARK | VOICE TEXT DATA WITH TIME STAMP | VIDEO TEXT DATA WITH TIME STAMP | | DIGITAL BOARD TEXT DATA WITH TIME STAMP | DIGITAL BOARD DRAWING DATA WITH TIME STAMP |
|---|---|---|---|---|---|
| | | TEXT | DRAWING | | |
| | START<br><br>END | TIME MARK<br><br>TIME MARK | TIME MARK | TIME MARK | TIME MARK<br><br>FIG.1 |
| | START<br><br><br>END | TIME MARK<br><br>TIME MARK | TIME MARK | TIME MARK | |
| | START<br><br>END | TIME MARK | | | |
| | START<br><br>END | TIME MARK | | TIME MARK | TIME MARK<br><br>FIG.2 |

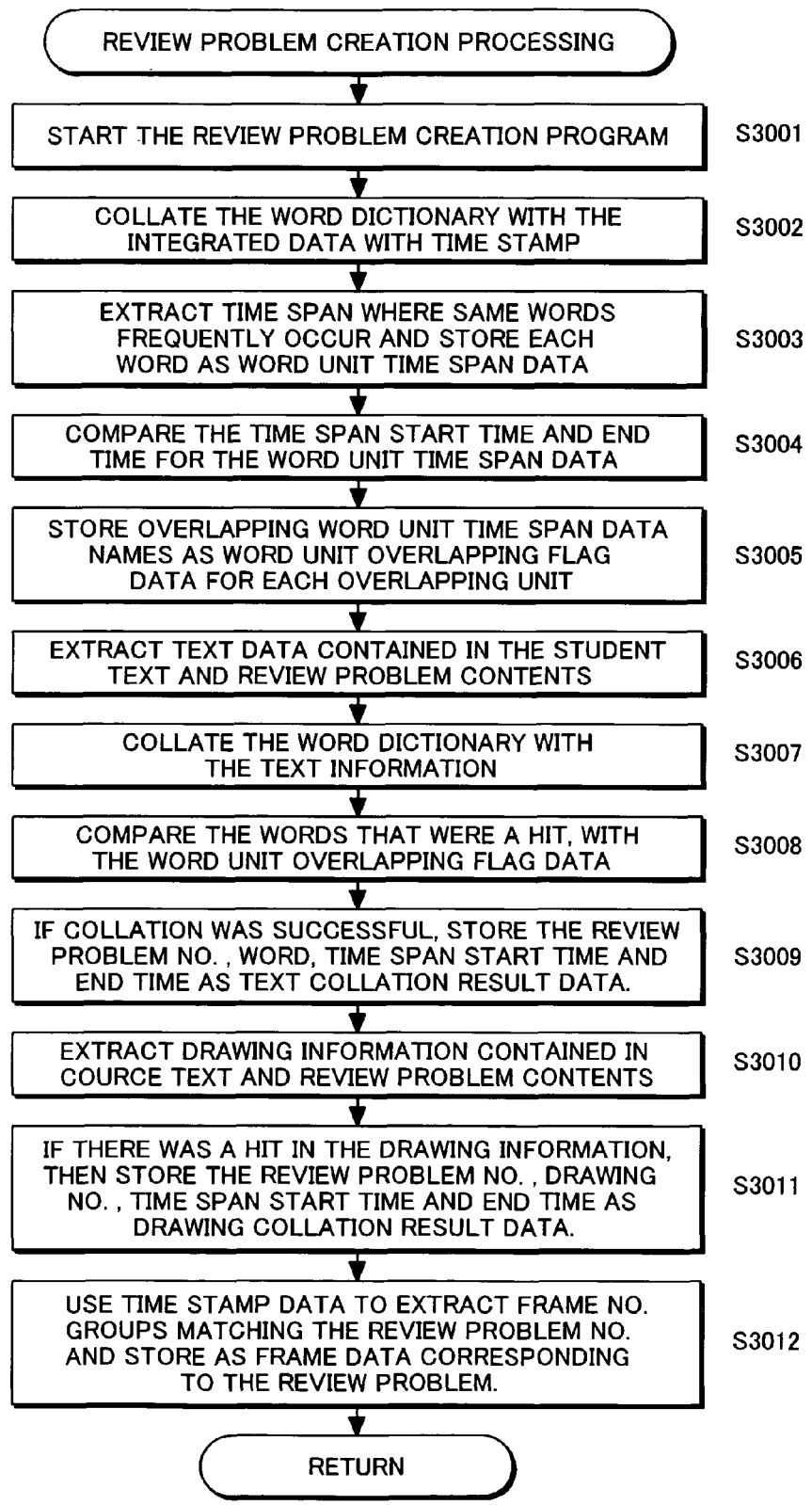

INFORMATION MANAGEMENT SERVER AND INFORMATION DISTRIBUTION SYSTEM

FIELD OF THE INVENTION

The present invention relates to an information management server and information distribution system utilizing a video of the class for creating educational contents matching the learning conditions of the student, and also providing instruction using these same contents.

BACKGROUND OF THE INVENTION

E-learning services are starting for conveying class contents to students (learners, course pupils) in remote areas by communication networks. In Japan, the main trend in services offering E-learning is asynchronous E-learning for providing asynchronous instruction typically by web-based education, or synchronous E-learning for providing synchronous instruction using satellite communication, TV telephone, or ASP, etc.

In asynchronous E-learning, the educational contents are created in advance and the student can utilize those contents to repeatedly receive instruction on those points the student did not sufficiently understand.

In synchronous E-learning, the class is conducted at a time determined in advance and students who could not participate or audit that class must review long term video data on that class. Student including those who participated or audited the class can confirm whether they understood the contents of the class by solving review problems. However few measures are available for supplemental instruction of portions of the class not properly understood.

To resolve these problems, a remote lecture assist device to assess the degree of subject comprehension and provide suitable multimedia learning material at student sites were proposed (See for example patent document 1.).

A teaching assist system was proposed for centralized control of the display on the instructor terminal, and sharing of the application among the instructor terminal and student terminal; allowing joint changes according to the purpose of use and lecture format, and distributing, calculating and displaying practice problems from the instructor terminal; and displaying the name of the application being run on the student terminal, student requests, and student image, and making it easy for the instructor to find the student operating status, situation and degree of comprehension, and making it easy for the student to convey his own requests to the instructor (See for example patent document 2.).

A method was proposed for easily finding the degree of comprehension of each student as needed by the instructor by using questionnaires on the lecture to the students (See for example patent document 3.).

A remote instruction system was proposed for verifying from the network, the degree of comprehension of each student in a hybrid type remote instruction system having instructional contents at both the server and the client (See for example patent document 4.).

[Patent document 1]
  JP-A No. 62173/1997
[Patent document 2]
  JP-A No. 123923/1998
[Patent document 3]
  JP-A No. 333538/1998
[Patent document 4]
  JP-A No. 249540/1999

In the about technology of the related art for synchronous E-learning, the student was able to repeatedly view video information on the lesson by recording it. However, unless all the video information was viewed from beginning to end, the student could not understand or verify his understanding of the contents of that video information.

Further, tutoring by advice given from instructor or tutor was carried out by the student himself by questions over the telephone or by writing mail. In such cases, the subject was limited only to sections that the student was aware he did not understand. So no tutoring was received on other sections of the subject that the student was not aware he needed help in understanding. This related art also had the problem that in many cases the replies to student questions by mail or other means were sent in the order handled by the instructor, so it was impossible to review those questions during instruction in real time.

SUMMARY OF THE INVENTION

In view of the above problems with the related art, the present invention has the object of providing an information management server and information server for indicating points in the video information already viewed or to be viewed that are not understood by the student, and also creating contents for enhancing the degree of comprehension of those points within the video information. The present invention has the further object of providing effective tutoring by finding the learning level of each among many students.

To resolve the above mentioned problems, the present invention is an information management server connected for communicating with student terminals for distributing lecture contents to student terminals, and composed of an accumulator section to store electronic data on the lecture contents, a holding section to hold information relating to the lecture contents, a send section to send lecture contents and lecture-related information to the terminal of the student, an analyzer section to analyze electronic data on the lecture contents, a matcher section to link lecture-related information with lecture contents based on those analysis results; and a control section for selecting lecture contents linked to lecture related information based on a reply to lecture-related material sent from the terminal of that student; and the send section sends those selected lecture contents to the student terminal that sent the reply for the lecture-related information.

BRIEF DESCRIPTION OF THE DRAWINGS

FIG. 10 is drawing showing the structure of the integrated data with timestamp;

FIG. 11 is showing in detail the processing for creating review problems;

DETAILED DESCRIPTION OF THE PREFERRED EMBODIMENT

The preferred embodiments of the distribution system of the present invention are described next while referring to the accompanying drawings.

Figure 1:
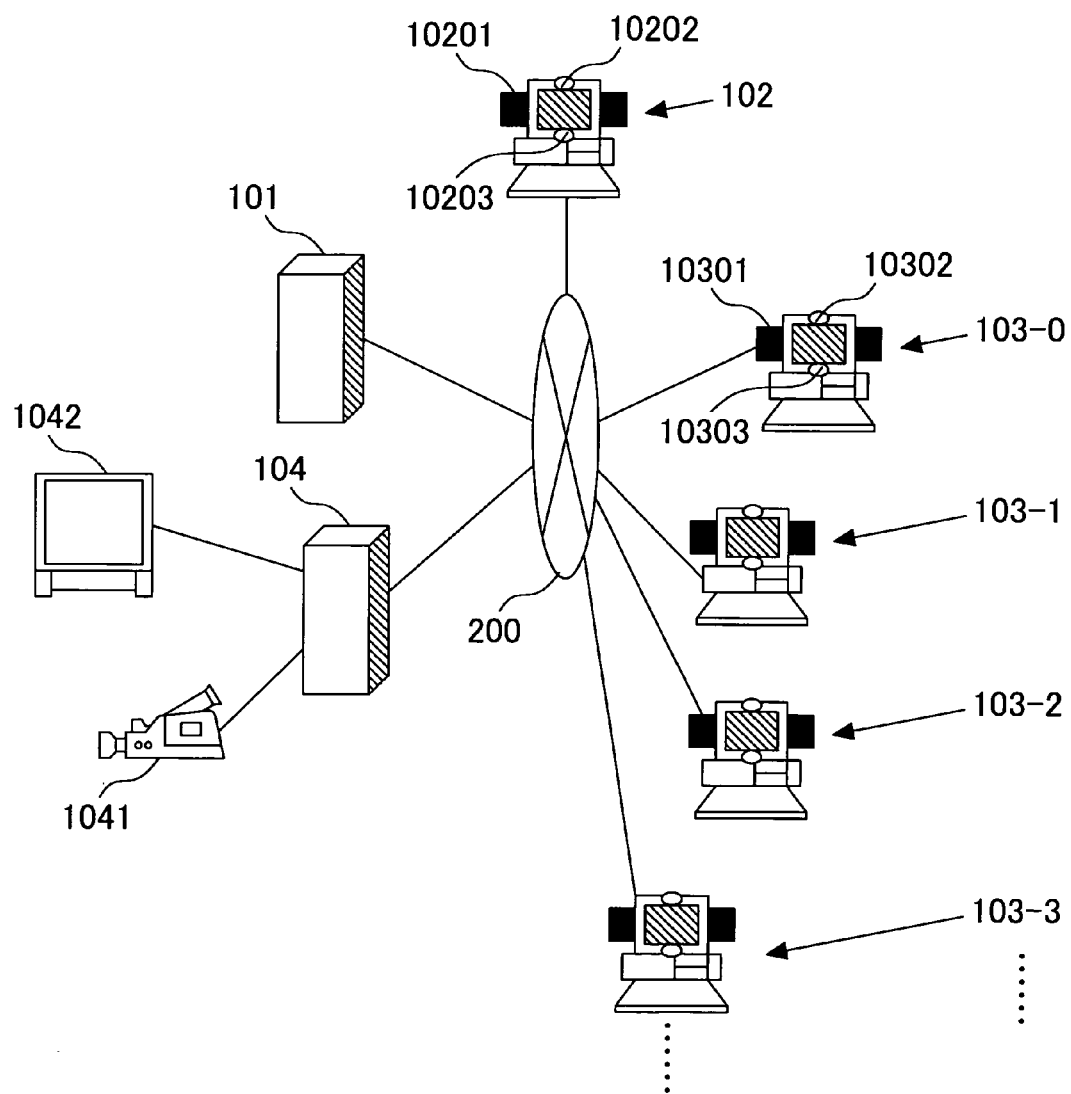
FIG. 1 is a block diagram showing the structure of the distribution system of the embodiment of the present invention.

FIG. 1 is a block diagram showing the structure of the distribution system of the embodiment of the present invention.

The instructional information management server 101, the video storage server 104, the tutor PC 102, the multiple student PC 103, (103-0, 103-1, 103-2, 103-3, . . . ) are respectively connected respectively to a network (for example, the Internet 200).

The instructional information management server 101 is a server for accumulating learning-related information, analyzing the accumulated information and distributing the analyzed information.

The video storage server 104 is a server for acquiring and accumulating video information and audio (including voice information) information filmed of the class such as the lecture by the instructor. In this video storage server 104, a class video camera 1041 films the instructor during the class and records the voices (audio). The writing of the instructor during the class is output as electronic data to a digital board 1042 (connected to the server).

The tutor PC 102 is a terminal used by the tutor for teaching. To communicate with the student, the tutor PC 102 contains a speaker 10201 for playing back the voice of the student, a camera 10202 for filming the tutor, and a microphone 10203 for acquiring the voice of the tutor.

The student PC 103 is a terminal used by the student for learning. To communicate with the tutor, each student PC 103 contains a speaker 10301 for playing the voice of the instructor or tutor, and a camera 10302 for filming the student, and a microphone 10302 for acquiring the voice of the student. Multiple student PCs 103 are installed according to the number of students taking the class. Each student PC 103 is connected over a network to the instructional information management server 101, the tutor PC 102 and the video storage server 104.

The instructional information management server 101, the video storage server 104, the tutor PC 102, and the multiple student PCs 103 may be connected to a network that is not the Internet. For example, the instructional information management server 101, the video storage server 104, the tutor PC 102, and the multiple student PCs 103 may all also be installed within the same building and each connected to a network such as the Ethernet (registered trademark). The instructional information management server 101, the video storage server 104, and the tutor PC 102 may be connected by a network, and the multiple student PCs 103 may be separately connected by telephone line or a CATV (cable television) line, etc.

The distribution system of the present embodiment is a system for distributing educational information for instructing a plurality of students in the contents of a particular class or lecture. This system creates supplemental (lesson) contents utilizing the video data filmed of the class run by the instructor, and also carries out tutoring adapted to the learning state of the student. In other words, the student uses the student PC 103 to learn the (class) contents for example for the review problems sent from the instructional information management server 101. The learning status of the student is recorded in the student PC 103 and that recorded data is sent from the student PC 103 to the instructional information management server 101. The instructional information management server 101 extracts the learning status of the user (student) from the recorded data that was sent, creates supplemental lesson contents using the extracted data, and also tutors the student.

In these specifications, the lecture given by the instructor may include cases other than regular academic classes, for example where a person with knowledge of a certain subject provides that knowledge to participant such as in an English conversation class.

Figure 2:
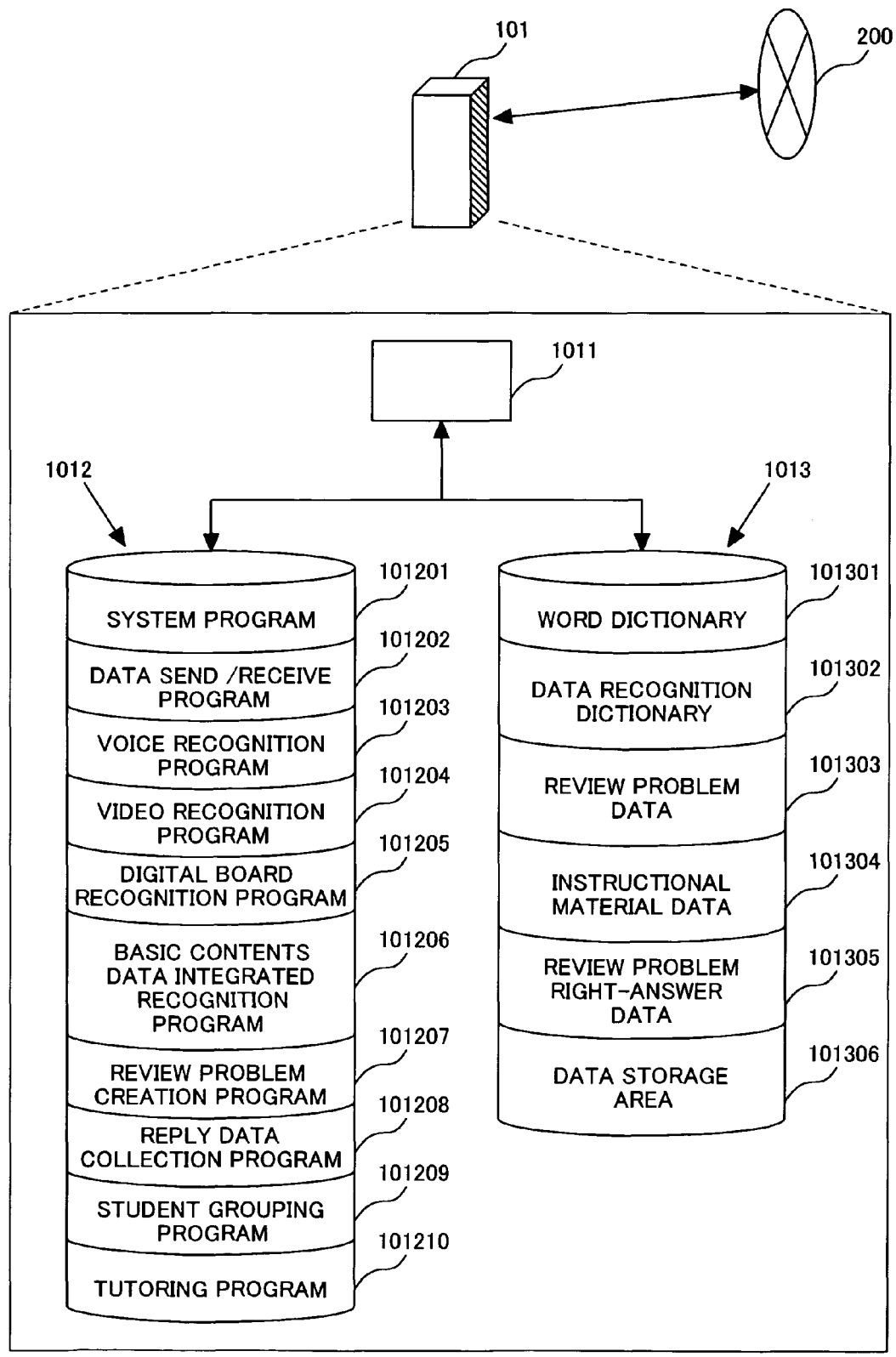
FIG. 2 is a block diagram showing the structure of the instructional information management server 101.

The structure of the instructional information management server 101 is described next while referring to FIG. 2.

The CPU 1011 performs processing for the instructional information management server 101 according to the program that was started up. The memory 1012 is composed of devices such as DRAM devices and temporarily loads and stores the program and data that was started. More specifically, the starting up the server loads the memory 1012 with: the system program 101201 for controlling the entire system, the data send/receive program 101202, the voice recognition program 101203, the video recognition program 101204, the digital board recognition program 101205, the basic content data integrated recognition program 101206, the review problem creation program 101207, the reply data collection program 101208 for collecting and editing reply data from the student, and the student grouping program 101209 for grouping the students for tutoring according to their learning level, etc.

By running these programs stored in the memory 1012, the CPU 1011 functions as a send section to send the lecture contents and review problems (lecture-related information) to the student PC 103, an analyzer section to analyze electronic data of the lecture contents, a matcher section to match the review problems with the previous lecture contents based on analysis results, a control section to select the lecture contents matched to the review problems (lecture-related information) based on replies (replies to lecture-related information) to the review problems sent from the student PC 103, and a grouping section to sort those students according to their replies (replies to lecture-related information) to the review problems.

The hard disk 1013 stores programs and data. Data held in the hard disk 1013 is loaded in the memory 1012 as needed and processed by the CPU 1011. More specifically, the word dictionary 101301 used for extracting language information from the accumulated video data, the data recognition dictionary 101302 for recognizing all types of event data, the review problem data 101303 for the student, the instructional material data 101304 used by the student in the lesson, the true-false data 101305 for review problems are stored in the hard disk 1013. A data storage area 101306 is also provided for temporarily storing data of all types.

Figure 3:
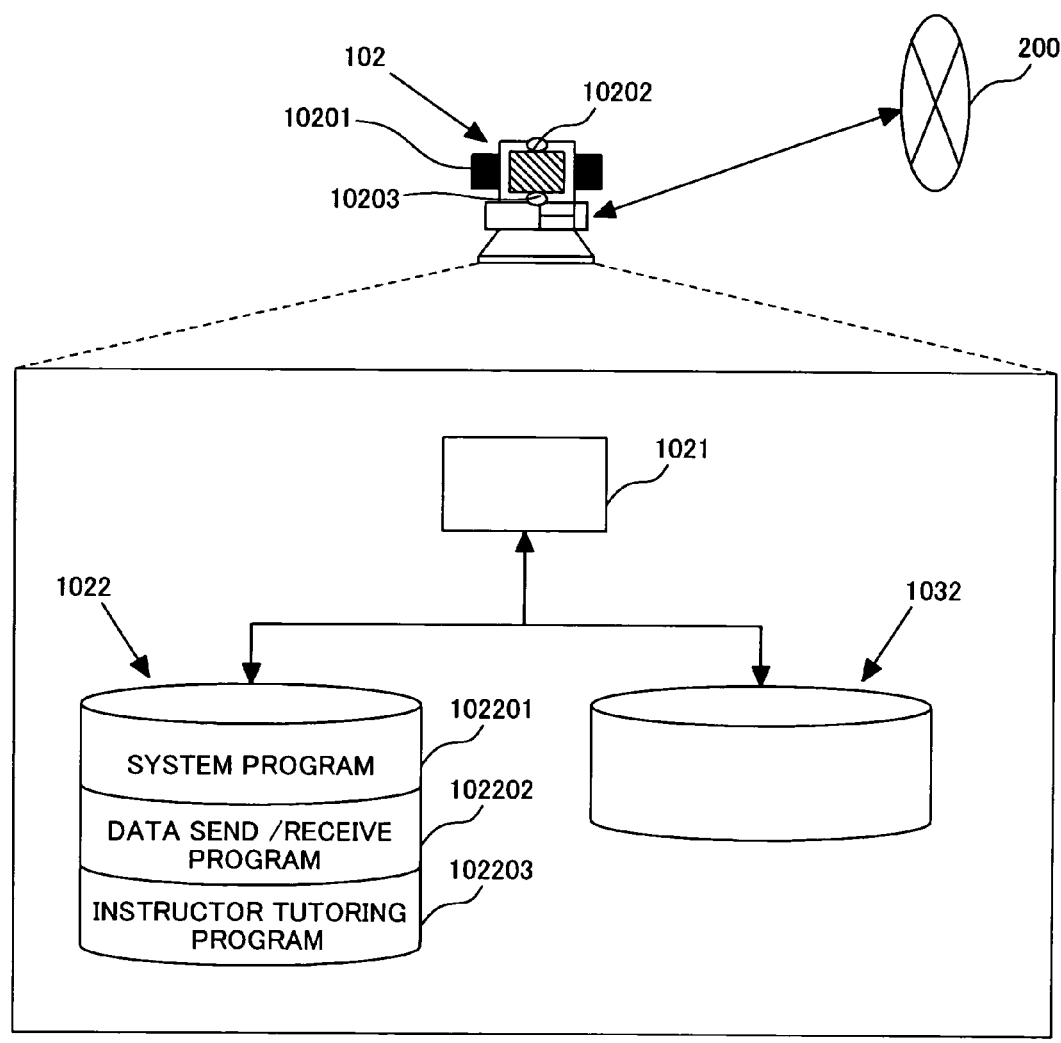
FIG. 3 is a block diagram showing the structure of the tutor PC 102.

The tutor PC 102 is next explained in detail while referring to the structural drawing of FIG. 3.

The CPU 1021 performs processing in the tutor PC 102 according to the program being run. The system program 102201 for controlling the operation of the tutor PC 102, the data send/receive program 102202 for sending and receiving all types of data, and the instructor tutoring program 102203 for tutoring by the tutor are stored in the memory 1022. The hard disk 1023 stores programs and data.

Figure 4:
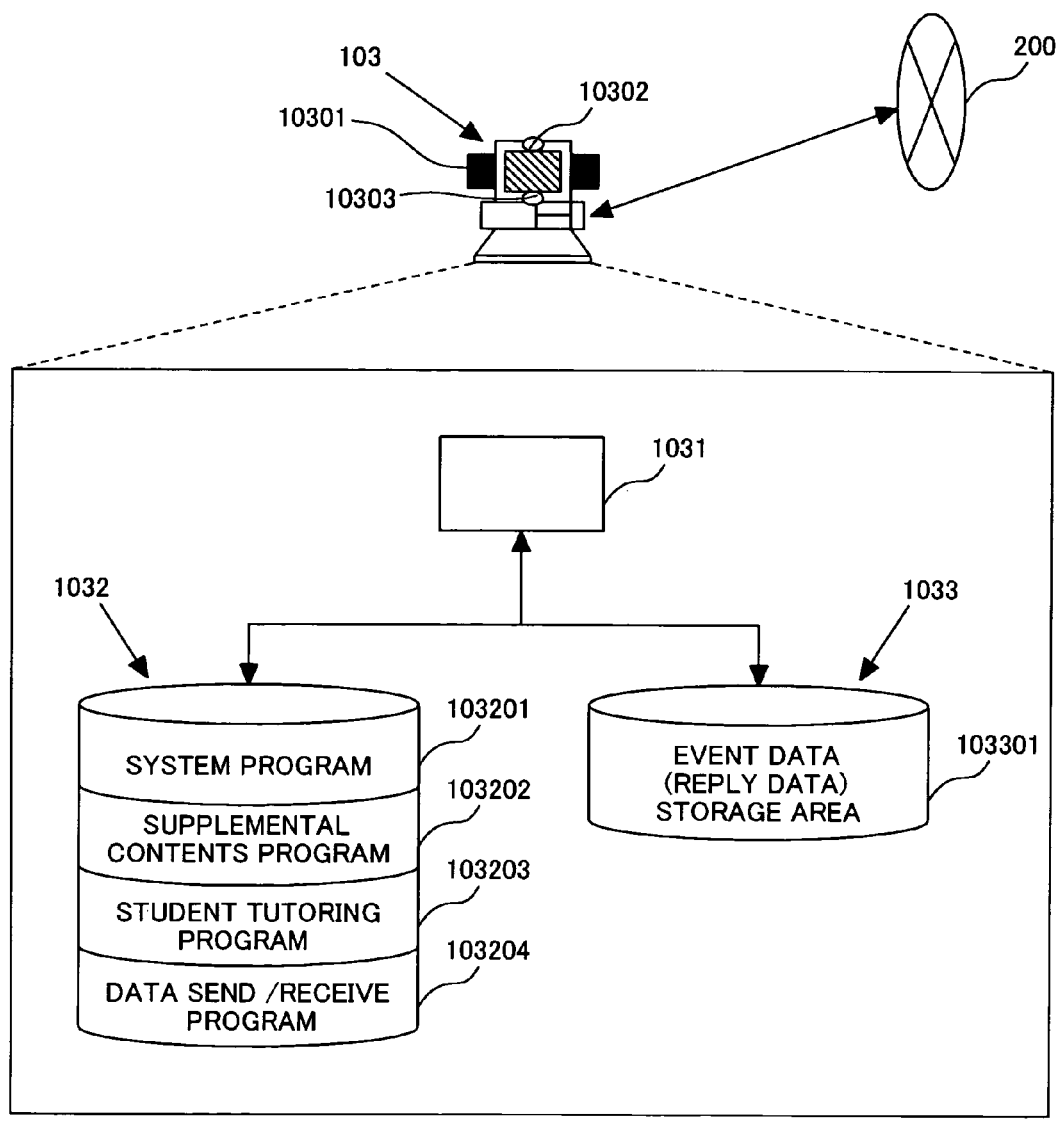
FIG. 4 is a block diagram showing the structure of the student PC 103.

The student PC 103 is next described in detail while referring to the structural drawing of FIG. 4.

The CPU 1031 performs processing in the student PC 103 according to the program being run. The system program 103201 for controlling operation of the student PC 103, the supplemental contents program 103202 for receiving supplemental contents sent from the instructional information management server 101, the student tutoring program 103203 for the student to receive tutoring, and the data send/receive program 103204 for sending and receiving data of all types are stored in the memory 1032. An event data storage area 103301 for storing event data from user operation (besides replies, the event data also includes for example, replies from questionnaires to the student, and questions from the student, etc.) such as student replies to the supplemental contents is provided in the hard disk 1033.

Figure 5:
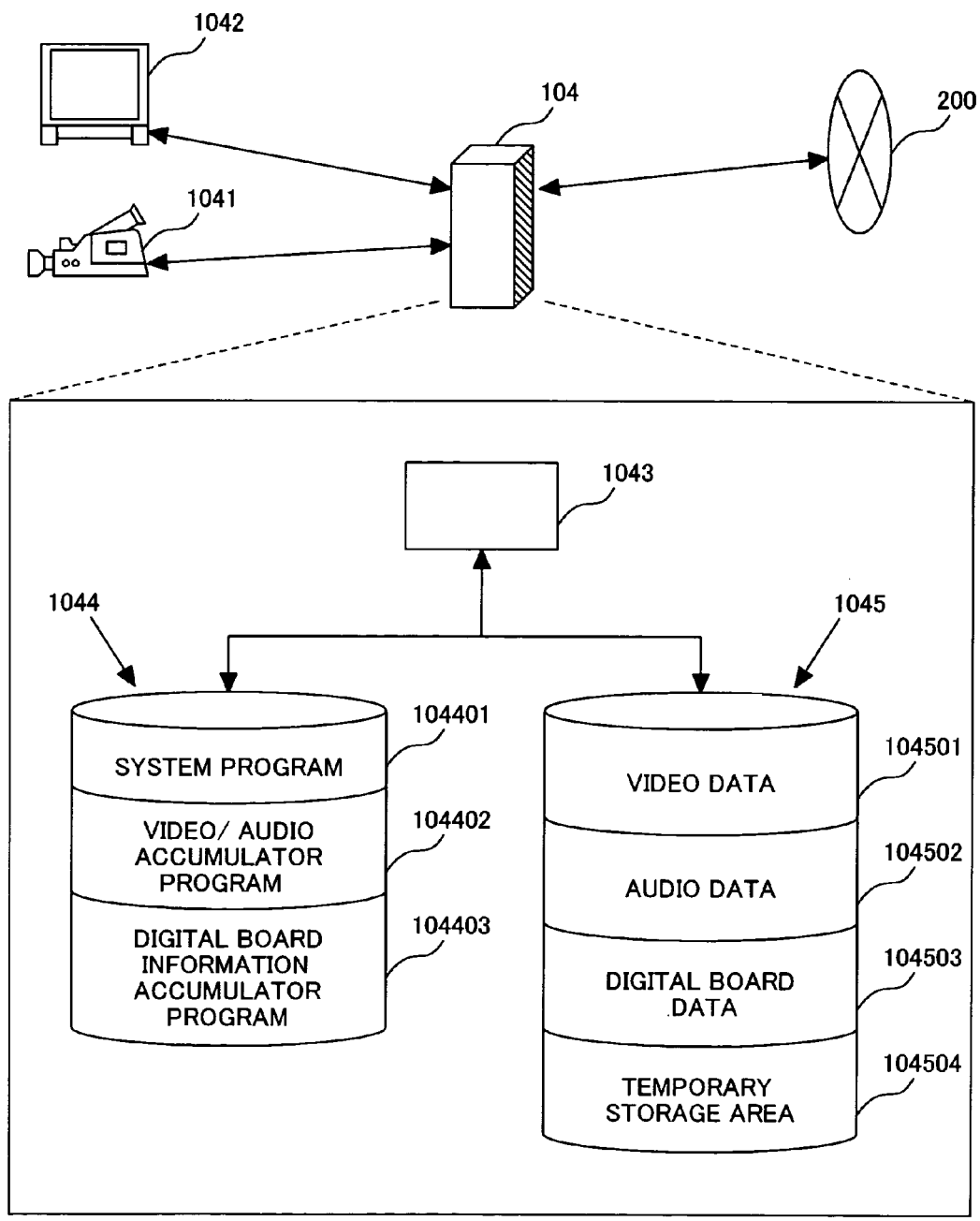
FIG. 5 is a block diagram showing the structure of the video accumulator server 104.

The video accumulator server 104 is next described in detail while referring to the structural drawing of FIG. 5.

The CPU 1043 is a control device for performing processing in the of the video accumulator server 104 according to the program being run. The system program 104401 controlling the operation of the video accumulator server 104, the video/audio accumulator program 104402 for accumulating video and audio sent from the class video camera 1041, and the digital board information accumulator program 104403 for accumulating digital board data sent from the digital board 1042 are loaded and stored in the memory 1044. The video data storage area 102401, the audio data storage area 104502, the digital board data storage area 104503, and a temporary storage area 104504 for temporarily storing the frame data are provided on the hard disk 1045. The filmed video data is stored in the video data storage area 102401 by the video/audio accumulator program 104402, and the audio data that was collected is stored in the audio data storage area 104502. The digital board data such as characters and figures drawn on the digital board 1042, are stored in the digital board data storage area 104503 and accumulated on the hard disk 1045.

Figure 6:
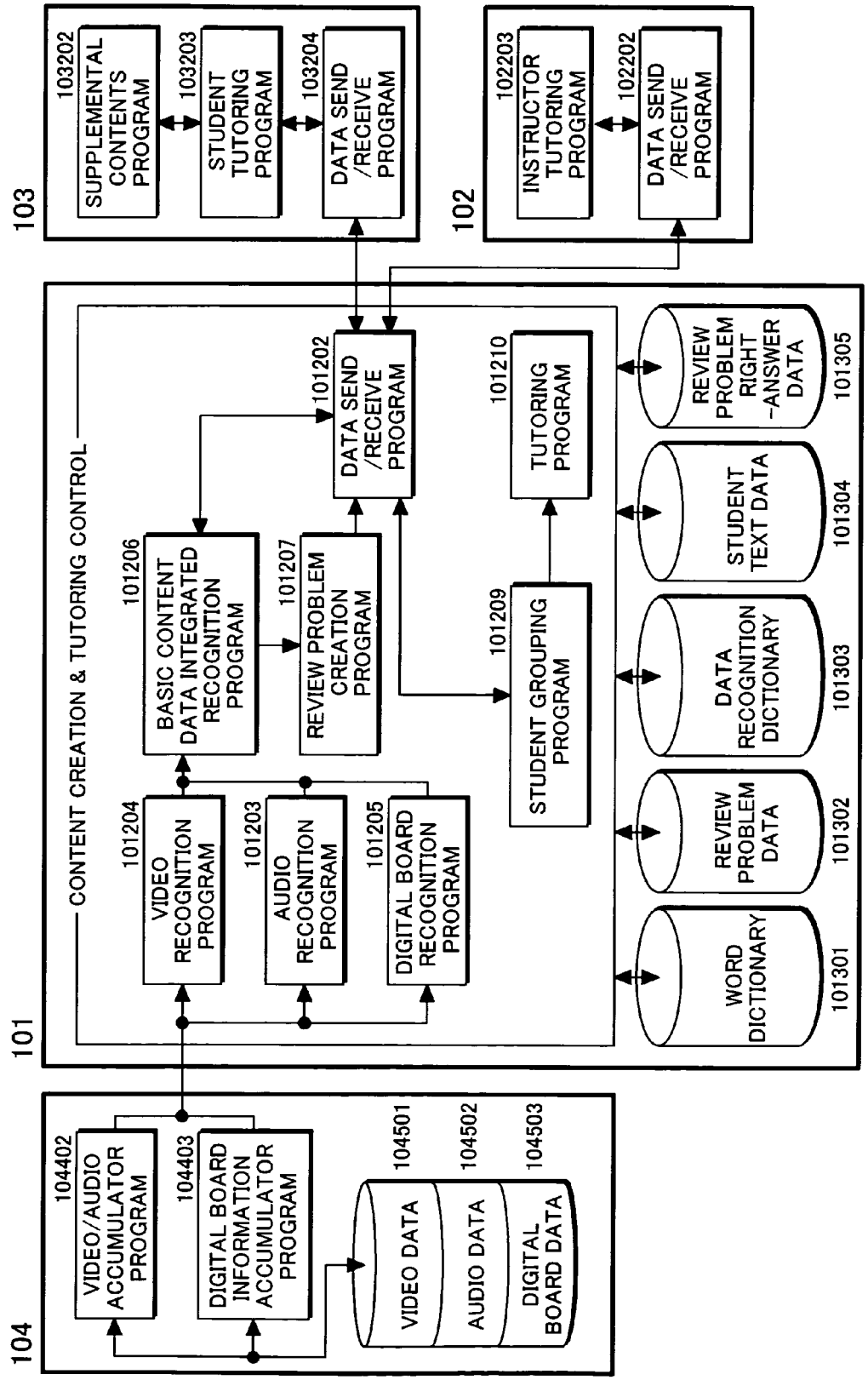
FIG. 6 is a function block diagram expressing the distribution system in program units.

FIG. 6 is a function block diagram expressing the distribution system in program units in the embodiment of the present invention.

The video accumulator server 104 acquires video and audio from the class video camera 1041 by way of the video/audio accumulator program 104402, and stores it in the hard disk 1045 as a video data set and audio data set. These (data sets) are A/D converted, time information added, and sent to the instructional information management server 101 as video frame data and audio data. The video accumulator server 104 acquires a digital board data set from the digital board 1042 by means of the digital board information accumulator program 104403 and accumulates it in the hard disk 1045. Time information is added to the accumulated digital board data sets and these are sent as digital board data to the instructional information management server 101.

The instructional information management server 101 receives video frame data, audio data, and digital board data from the video accumulator server 104. The video recognition program 101204 extracts the text information and the drawing information from the video frame data, adds time information to it, and stores it as video text data with a time stamp in the hard disk 1013. The audio recognition program 101203 extracts the text information from the audio data, adds time information to it, and stores it as voice text data with time stamp in the hard disk 1013. The digital board recognition program 101205 extracts text information and drawing information from the digital board data, adds time information to it, and stores it in the hard disk 1013 as digital board text data with time stamp, and digital board drawing data with time stamp.

Next, the video text data with time stamp, voice text data with time stamp, digital board text data with time stamp, and digital board drawing data with time stamp are stored by the basic content data integrated recognition program 101206 in the hard disk 1013 as integrated data with time stamp along a time axis.

The exercise problem creation program 101207 next collates the integrated data with time stamp, with the word dictionary stored in the hard disk 1013. This program 101207 then extracts locations in the integrated data with time stamp where the same term frequently occurs. The student text and the review problem data stored in the hard disk 1013 are also collated with the word dictionary in the same way and frequently appearing words are extracted. Video frame data for review problems linked to a review problem No. are created for locations where the frequently appearing words in the integrated data with-time-stamp matches the review problem data and course material data and this (video frame data) is stored in the hard disk 1013.

The data send/receive program 101202 sends the review problems to the student PC 103.

On the student PC 103, the student solves the review problems that were sent. These are then sent by the data send/receive program 103204 as reply data to the instructional information management server 101.

On the instructional information management server 101, the student grouping program 101209 makes true-false judgments of reply data sent from the student PC 103. The student grouping program 101209 then sends video frame data matching the problem numbers of review problems having a wrong answer, to the student PC 103. The student grouping program 101209 in other words contains a section for making true-false judgments.

On the instructional information management server 101, the student grouping program 101209 groups the students according to the error points in the reply data sent from the students. In other words, the student grouping program 101209 contains a grouping section. The grouped student data is sent to the tutor PC 102 and tutoring of each group is performed by the instructor tutoring program 102203.

Figure 7:
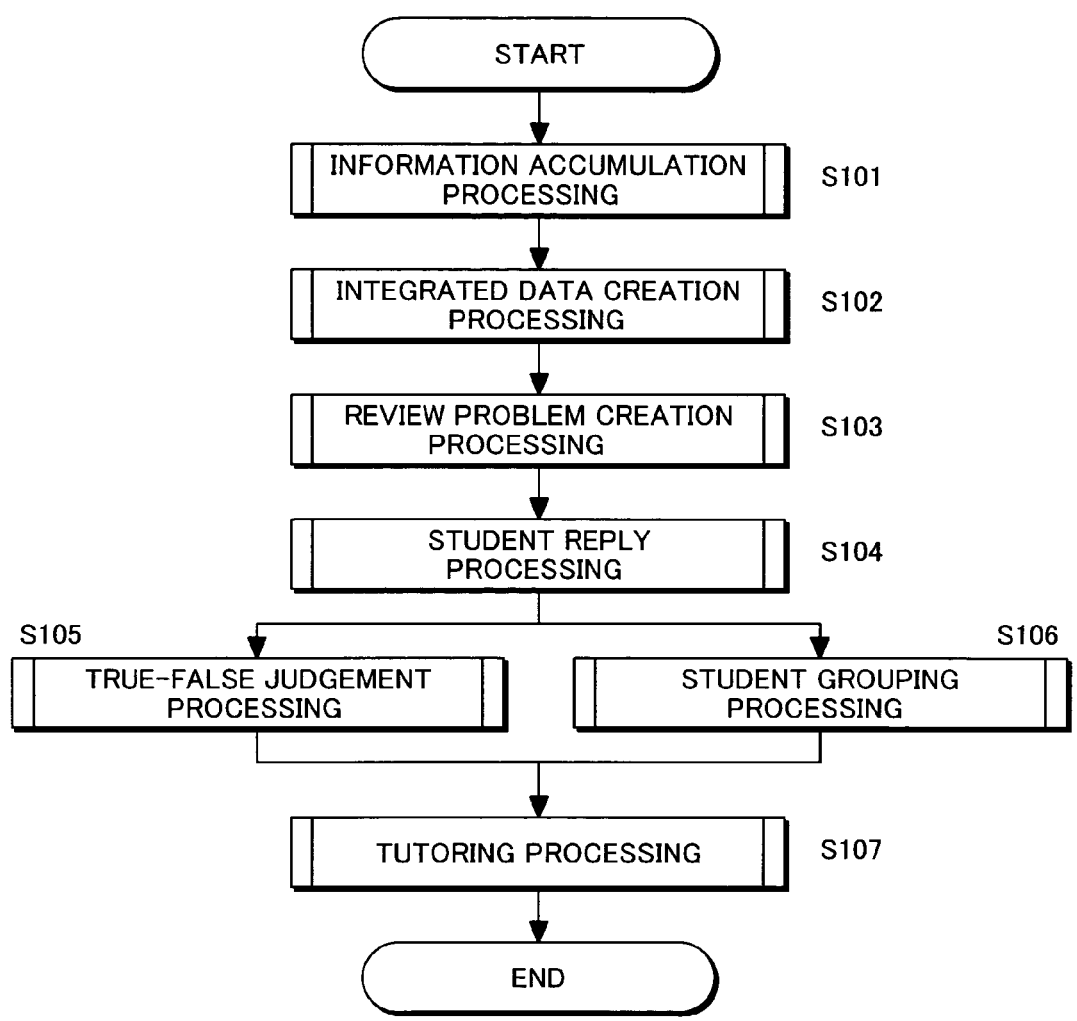
FIG. 7 is a flow chart showing the processing performed by the distribution system.

The operation of the distribution system of the embodiment of the present invention is described next FIG. 7 is a flow chart showing the processing performed by the distribution system of the present embodiment of the invention.

The video accumulator server 104 acquires class video data and voice data with the class video camera 1041. Writing in class on the digital board 1042 is acquired digital board data (digital board text data, digital board drawing data) and stored in the hard disk 1045 where information accumulating is performed (S101).

Next, on the instructional information management server 101, the text information and drawing information is extracted from the data received from the video accumulator server 104. Time information is added to this extracted data. The integrated data generation process which stores this data as integrated data-with-time-stamps is then run (S102).

On the instructional information management server 101, the class instruction material and previously created exercise problems are linked with the integrated data-with-time-stamp. This linked data is stored as review problem frame data and processed to generate review problems is run (S103).

Next, on the student PC 103, the events caused by the student such as replies to exercise problems sent from the instructional information management server 101 are collected and the student replies are processed (S104).

The event data collected by the student PC 103 are next acquired on the instructional information management server 101. The server 101 performs true-false judgment of the replies to the exercise problems, sends supplement learning contents in response to wrong answers, and performs true-false judgment processing (S105). Student grouping is performed in parallel with this (true-false judgment) processing to sort the students according to previously completed true-false results (S106).

Next, tutoring processing is run on the tutor PC 102. This tutoring may include supplemental learning for each level of the grouped students (S107).

Supplemental contents are created from the class video data, voice data, and digital board data in this tutoring processing. Supplemental learning contents can be sent and a review made in response to results from true-false judgment of exercise problem replies from the student and wrong answers to problems. Students can also be grouped according to wrong answers received and tutoring given to each of these groups.

Figure 8:
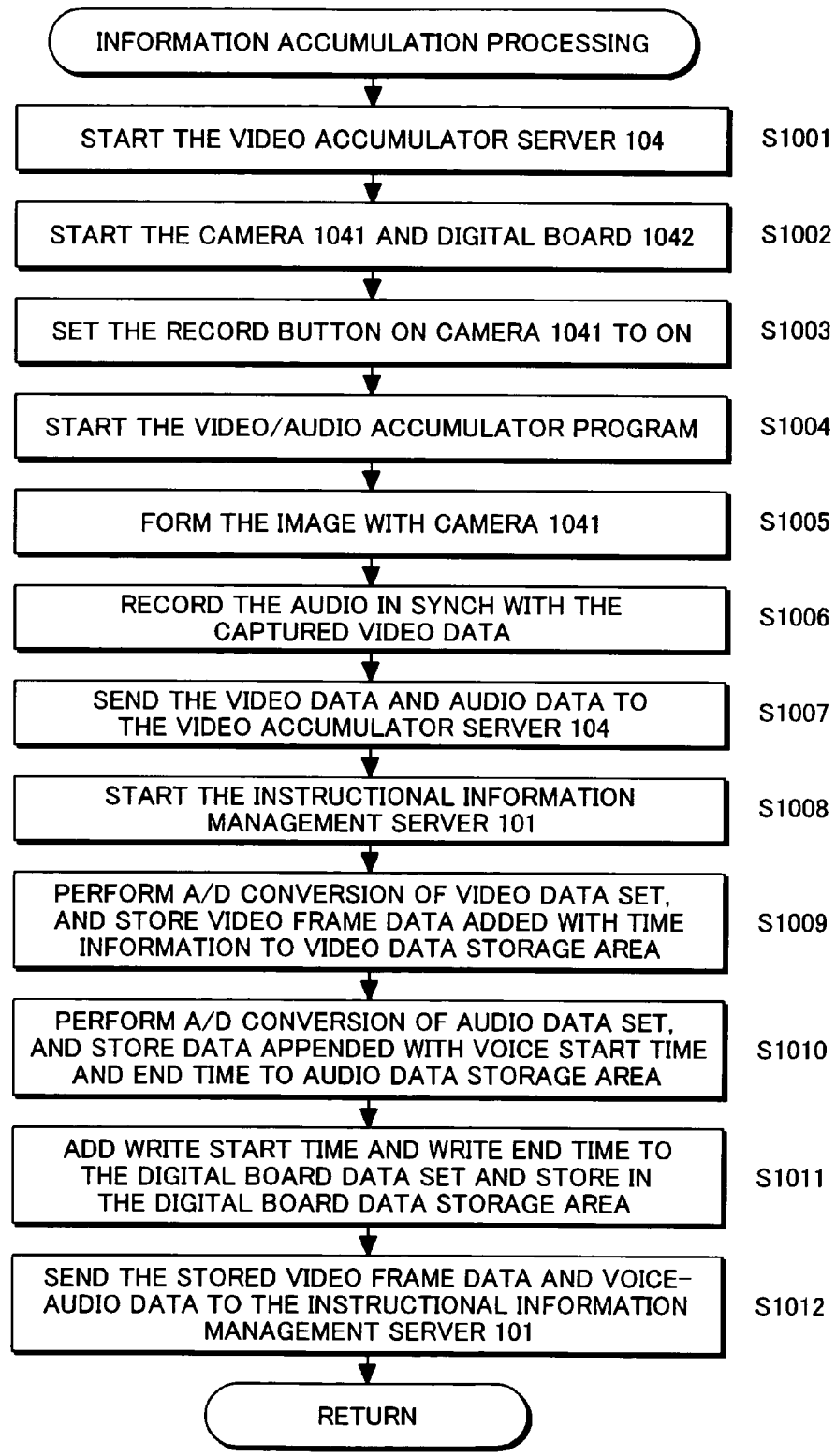
FIG. 8 is a flow chart showing the information accumulation processing in detail.

A detailed description of the above related information accumulation processing (S101 of FIG. 7) is described next while referring to the flow chart of FIG. 8.

First of all, the video accumulator server 104 initializes and starts up (S1001). Next, the class video camera 1041 and the digital board 1042 connected to the same server (104) are initialized and started (S1002). The class video camera 1041 is set to record status (S1003). The video/audio accumulator program on the video accumulator server 104 then starts up (S1004). Video of the class is made at this point and preparation for accumulating the video data in the video accumulator server 104 are completed. The class video camera 1041 then starts filming the class (S1005). The audio (for example, the instructor's voice) is also recorded at this time in synchronization with the capturing (filming) of video data of the class by the class video camera 1041 (S1006).

The video data that is filmed and the audio data that is recorded are sent continuously to the video accumulator server 104 by the processing of S1005, S1016 (S1007). The information written on the digital board is at this time sent continuously to the video accumulator server 104 in the same way and accumulated in the video accumulator server 104. The video recording and audio recording end at the point that the class is finished and recording on the class video camera 1041 is turned off (record-off). The data sent to the video accumulator server 104 and accumulated there is stored in the temporary storage area 104304 of video accumulator server 104 as a video data set, audio data set and digital board data set.

The instructional information management server 101 next starts up (S1008). The instructional information management server 101 may be started in step 1012 in the period up to receiving of the video frame data, audio data and digital board data.

The video data set stored in the temporary storage area (or buffer) is A/D (analog-to-digital) converted by the video accumulator server 104. A video time mark is added to this A/D converted data and the data stored in the video data storage area 104501 of the hard disk 1045 as video frame data (S1009). The audio data set is also A/D converted in the same way. An audio start time mark and finish time mark is added to the converted data. This data is then stored in the audio data storage area 104502 of the hard disk 1045 as audio data (S1010). A write-start time mark and end time mark is added to the digital board data set and then stored in the digital board data storage area 104503 of the hard disk 1045 (S1011).

The video accumulator server 104 next sends the stored video frame data, audio data and digital board data to the instructional information management server 101 (S1012).

Figure 9:
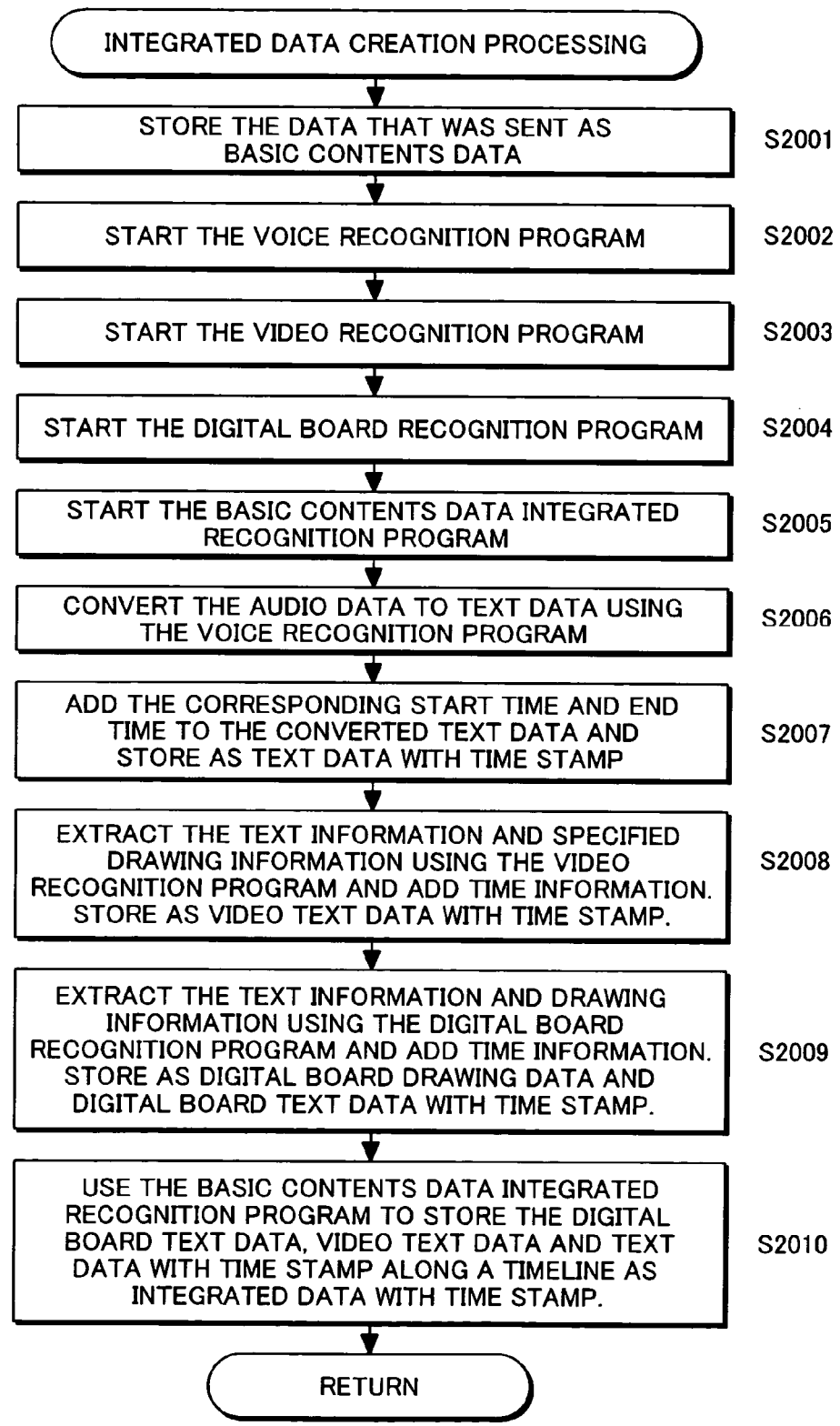
FIG. 9 is a flow chart showing in detail the processing for creating the integrated data.

The processing (S102 of FIG. 7) for creating integrated data is next described in detail while referring to the flow chart of FIG. 9.

The instructional information management server 101 stores the video frame data, audio data and digital board data sent from the video accumulator 104, as basic contents data in the data storage area 101306 (S2001). The voice recognition program 101203, the video recognition program 101204, the digital board recognition program 101205, and the basic content data integrated recognition program 101206 then start (S2002 to S2005).

Next, the voice recognition program 101203 recognizes (identifies) voices from audio data in the stored basic contents data, and converts the voices to text data (S2006). This voice text data is divided up into voice sections (sentences). The voice start time and end times that were added to the audio data, are appended to corresponding points in the converted voice text data and stored in the data storage area 101306 as voice text data with time stamps (S2007).

Next, the video recognition program 101204 extracts text information and drawing information contained in the video. Drawing information for example is extracted from images (drawings in the class material, etc.) on a clipboard shown to the students by the instructor. This drawing information is further collated with round and square predetermined templates and particular drawing information contained in these templates is extracted. The video time marks (timestamp) appended with video frame data, are added to corresponding locations in the extracted text information and specified drawing information. This is then stored as video text data with time stamps in the data storage area 101306 (S2008).

The digital board recognition program 101205 next extracts the text information from the digital board data written on the digital board. Time stamps are added to the data as the time the text information and drawing information were entered on the digital board and time the text information and drawing information were erased from the digital board. This is then stored as digital board data with time stamps in the data storage area. The drawing information composed of the time drawing information was entered on the digital board, the time drawing information was erased from the digital board, and the drawing number (No.) assigned to the drawing, and drawing vector data entered on the digital board (drawing original data) are stored in the data storage area as digital board data with time stamps (S2009).

Finally, the basic contents data integrated recognition program 101206 creates integrated data with time stamps matching a time base, from the voice text data with time stamp, video text data with time stamp, digital board text data with time stamp and digital board drawing data with time stamps. This data is stored in the data storage area 101306 (S2010).

A typical structure of this integrated data with time stamp is described while referring to FIG. 10.

The integrated data with time stamp is composed of voice text data with time stamp converted from audio data, video text data with time stamp converted from video data, digital board text data with time stamp converted from digital board data and digital board drawing data with time stamps.

Voice text data with time stamps composed of text data converted from audio data added with time stamps (voice start time mark, end time mark) is contained in the integrated data in order along a time line. Video text data with time stamp composed of text information converted from video data and specified drawing information respectively added with time stamps are contained in the integrated data with time stamps in order along a time line. Digital board text data with time stamps composed of digital board text data converted from digital board data and added with time stamps, are contained in the integrated data with time stamps in order along a time line. Digital board drawing data with time stamps is composed of drawing original vector data converted from digital board data and added with drawing numbers and time stamps. This is contained in the integrated data with time stamps in order along a time line.

The process for creating review problems (S103 of FIG. 7) is next described in detail while referring to the flow chart of FIG. 11).

The exercise problem creation program 101207 first of all starts up on the instructional server 101 (S3001). Next, the integrated data with time stamp stored in the data storage area 101306 of the instructional server 101 is collated with the word dictionary 101301 stored in the hard disk 1013 (S3002). Collation results and locations where the specified words appear frequently in the word dictionary are extracted from the integrated data with time stamp. The time stamps at those locations are extracted, and the times (time span start time, time span end time) that the specified words frequently appear are established. A word name, appearance count, time span start time, time span end time are stored for each frequently appearing word in the data storage area in time span data word units (S3003).

Next, the time span start time, and time span end time for the multiple word unit time span data are compared (S3004). There is an overlap in among the word unit time spans (time span start time and time span end time period). Namely, when there is an overlap in the time the words occur, the word unit time span data names that overlap are stored as flag data in the data storage area 101306 (S3005).

The review problem creation program 101207 extracts text information contained in the student instructional material and review problem contents stored in the hard disk 1013 (S3006). The text information that was extracted is then compared (collated) with the word dictionary 101301 stored on the hard disk 1013. When there is a match between a word in the word dictionary and that text information, a "hit" has occurred and that word (hit word) is extracted (S3007).

The hit word is further compared with the word unit overlap flag data stored in S3005 and collated (S3008). When the results of collating the extracted hit word with the word unit overlap flag data are a matching word, then that word, the review problem No. matching that word, the time span start time, and the time span end time are stored in data storage area 101306 as text collation result data (S3009).

The exercise problem creation program 101207 extracts the drawing information contained in the student class learning material and in the review problem contents stored in the hard disk 1013 (S3010). The program 101207 next collates the extracted drawing information with the digital board drawing data contained in the integrated data-with-time-span. When the results are a match (or hit) between the shape in drawing information and the shape in the digital board data, then that drawing (hit drawing) is extracted. Also, the drawing number for that hit drawing, the review problem number (No.) matching that hit drawing, the time span start time, and the time span end time are stored in data storage area 101306 as drawing collation match data (S3011).

The frame number (No.) group matching the review problem is next extracted from the time span data contained in the drawing collation match data stored in S3011 as well as the text collation match data that was stored in S3006. This is stored in the data storage area 101306 as video frame data matching the review problems linked to the review problem number {No.} (S3012).

Figure 12:
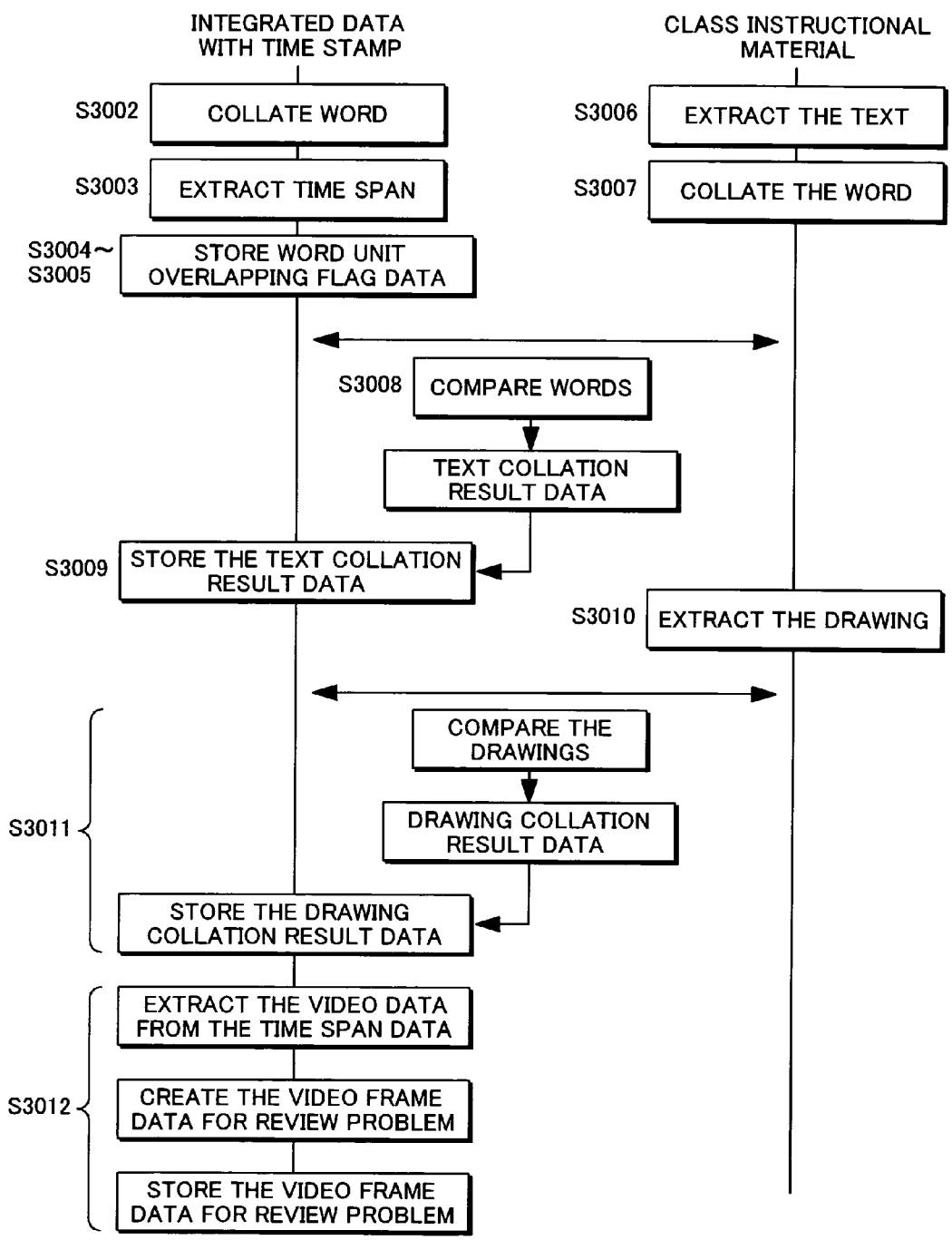
FIG. 12 is a sequence drawing showing in detail the processing for creating review problems.

FIG. 12 is a sequence drawing showing the process (FIG. 11) for creating review problems. The step No. in the description is the flow chart step No. shown in FIG. 11.

The exercise problem creation program 101207 collates the integrated data with time stamp, with the words in the word dictionary. The program 101207 extracts the time span where collation results show the same word frequently appears, storing it as word unit overlap flag data (S3002 to S3005).

The program 101207 also extracts text information from the student text for student class learning material and the review problems (S3006). The program 101207 collates the extracted text information with the word dictionary (S3007).

The program 101207 compares the word extracted from the text information with the word unit overlap flag data (S3008). If a matching word is found, then the program 101207 creates text collation match data corresponding to that work, the review problem No. matching that word (for example, containing that word), the time span start time, and the time span end time and stores that text collation match data (S3009).

The program 101207 next extracts the drawing information from the student class learning material and review problems (S3010).

The program 101207 collates this drawing information with the drawing data in the integrated data with time span. When the collation data shows a match, the program 101207 creates drawing collation match data corresponding to that drawing No., the review problem No. matching that drawing (for example, containing that drawing), the time span start time, and the time span end time, and stores it in the data storage area 101306 (S3011).

Video frame data for a location corresponding to the time span of the integrated data is extracted from the above stored time span information of the drawing correlation data and the text correlation data. Using this data, video frame data matching the review problem and linked to the review problem number (No.) is generated and stored in the data storage area 101306 (S3012).

Figure 13:
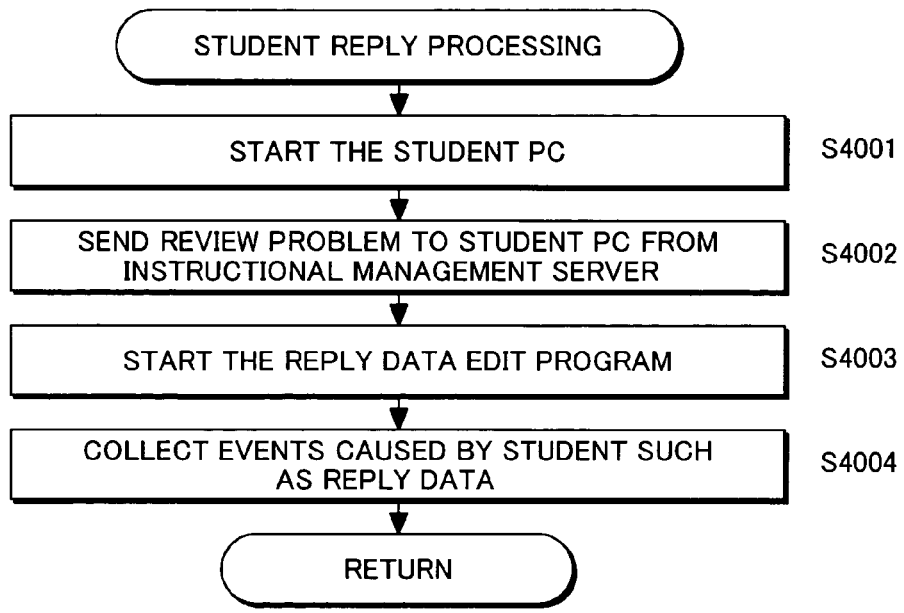
FIG. 13 is a flow chart showing in detail the student reply process.

The processing of the student replies (S104 of FIG. 7) is next described in detail while referring to the flow chart of FIG. 13.

The student PC 103 is started up (S4001). After the PC 103 is running, the instructional server 101 then sends review problems to the student PC 103 (S4002).

The instruction server 101 next starts up the reply data collection program 101208 (S4003). The student uses the student PC 103 to solve the review problems that were sent and enters replies to the review problems. The replies entered by the student are stored in the hard disk 1033. Event data such as the stored replies are collected by the reply data collection program 101208 and stored in the hard disk 1013 (S4004).

Figure 14:
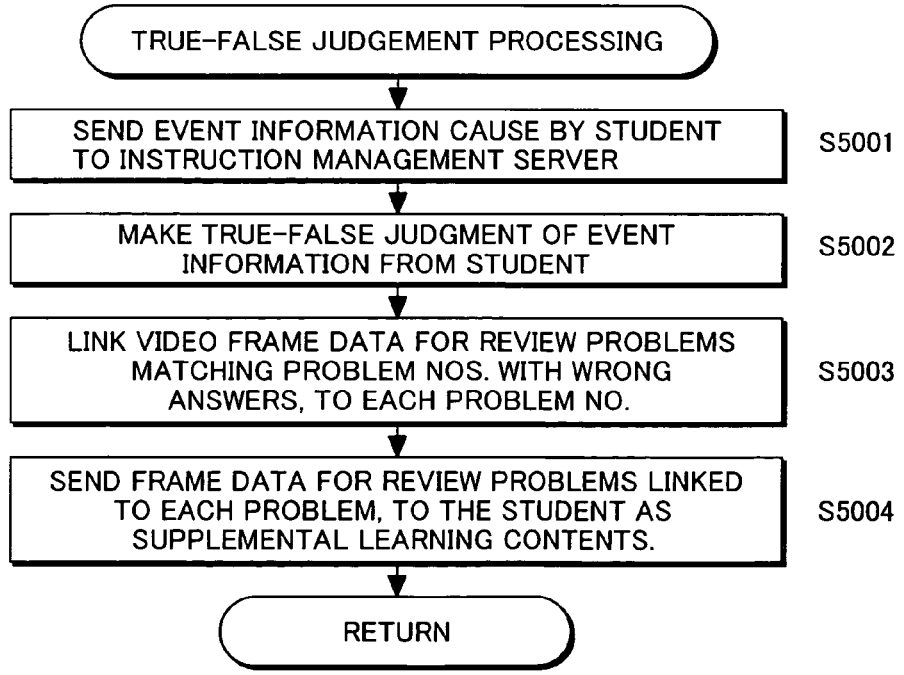
FIG. 14 is a flow chart showing in detail the true-false judgment processing.

The true-false judgment processing (S015 of FIG. 7) is next described in detail while referring to the flow chart in FIG. 14.

The student PC 103 first of all, sends event data from the student for example, data replies to any of the review problems, to the instructional server 101 (S5001).

The instructional server 101 that received the event data, performs true-false processing of the reply data in the event data (S5002). The instructional server 101 next extracts a review problem number (No.) matching a wrong reply in the reply data from the students. The server 101 also extracts video frame data for the review problem with a matching review problem No., and links that video frame data to the review problem No. (S5003). That video frame data linked to a review problem No. is then sent to the student PC 103 as supplemental learning contents corresponding to wrong answers (S5004). The student then corrects (reviews) the problems by viewing the received supplemental learning contents.

Related information (for example, hints and advice) is merged with the video frame data for review problems to generate the exercise contents. These (contents) may be sent to the student PC 103. In this way, other related information can be simultaneously used for learning besides the video data extracted for supplemental learning and the student's learning efficiency can be improved.

Figure 15:
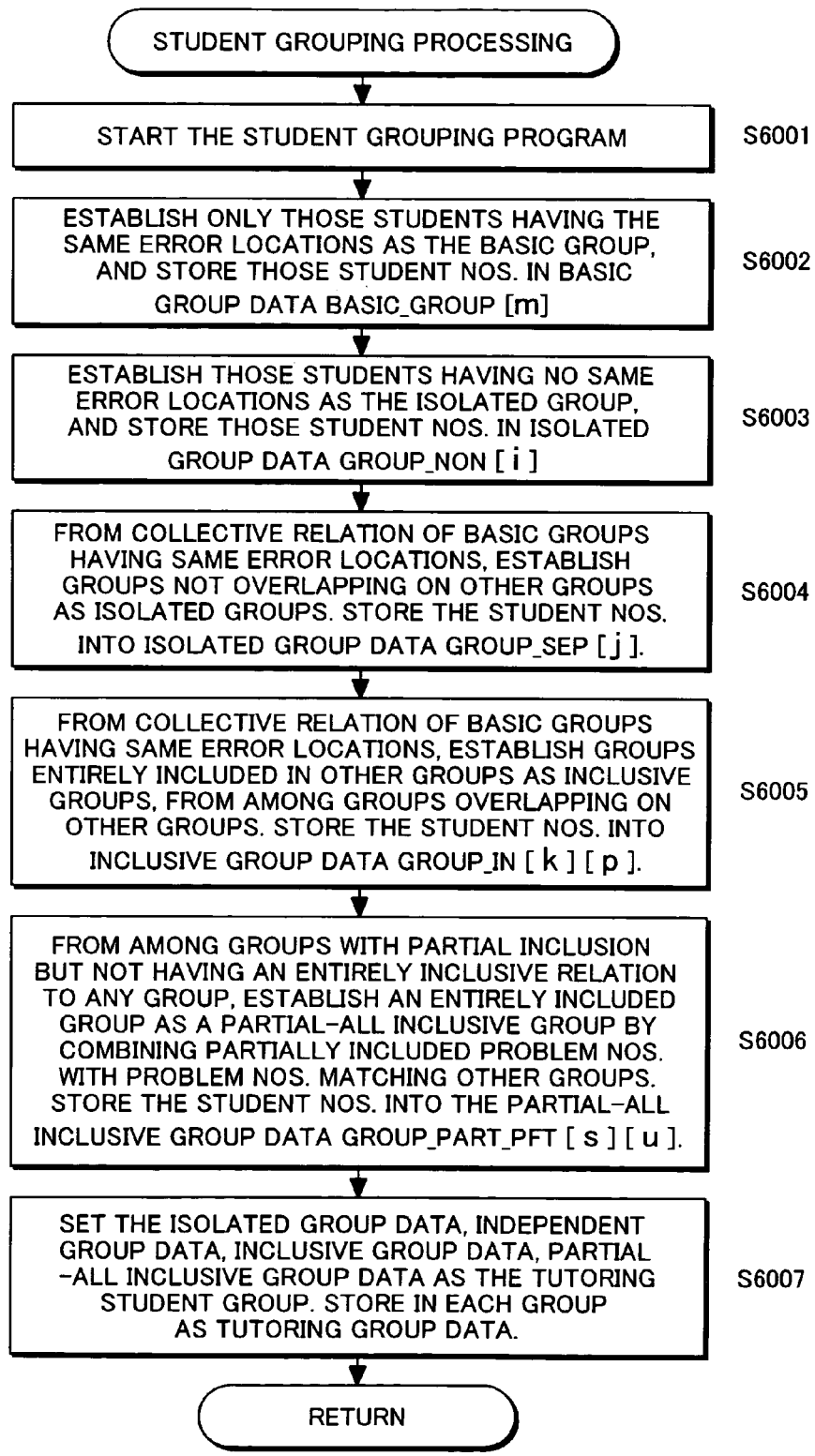
FIG. 15 is a flow chart showing in detail the student grouping processing.

The processing for grouping the students (S106 of FIG. 7) is described in detail next while referring to the flow chart in FIG. 15.

First of all, the instructional server 101 starts the student grouping program (S6001).

Next the grouping program extracts students who gave the same wrong answers from reply data in the student group that solved the review problems. Data is formed using this group as the basic group and student numbers (No.) are stored in the basic group data, Basic_Group [m] (m=0 . . . s: number of increments) (S6002).

Data is next formed as mass of independence (isolated groups) for student with no errors in the same locations. Student numbers (No.) are stored in the isolated group data Group_non [i] (I=0 . . . t: number of isolated groups) (S6003).

The collective relation among the basic group is extracted from the basic group having errors in the same locations. First of all, data is formed as groups (error locations do not overlap) called independent groups, with error locations not matching those of other groups. Student numbers (No.) are stored in the isolated group data, Group_sep [j] (j=0 . . . v: number of isolated groups) (S6004).

Data is formed as inclusive groups which are groups (all error locations completely match error locations of other basic groups) whose error locations are completely included in other basic groups (from among basic groups with overlapping error locations). Student numbers (No.) are stored in the inclusive group data, Group_in [k] [p] (K=0 . . . N: number of inclusive groups, p . . . q: inclusive group No., included group No.) (S6005).

Data is formed as completely part inclusive groups from completely inclusive groups by combining problem numbers of other basic groups to form partial inclusive problem numbers (No.) among groups (where error locations match in certain portions) that include errors in portions unrelated to error locations completed contained in any of the basic groups. Numbers are stored in completely part inclusive groups, Group_part_pft [s] [u] (s=0 . . . t: number of partial inclusive groups, u . . . f: included No., inclusive group No.: inclusive group No., included group No.) (S6006).

Finally, the isolated group data Group_non [i], the independent group data, Group_sep [j], the inclusive group data, Group_in [k] [p] and the completely part inclusive group data, Group_part_pft [s] [u] are set as the tutoring student group. The group No., student Nos. in the group, and reply data No. are stored in the data storage area as the combined tutoring group data. Further, the tutoring group data is sent to the tutor PC 102.

The grouping in the embodiment of the present invention was utilized for tutoring purposes. However, the grouping information may also be utilized for evaluation (grouping of student grades according to the reply results) for pass/fail in the class.

Figure 16:
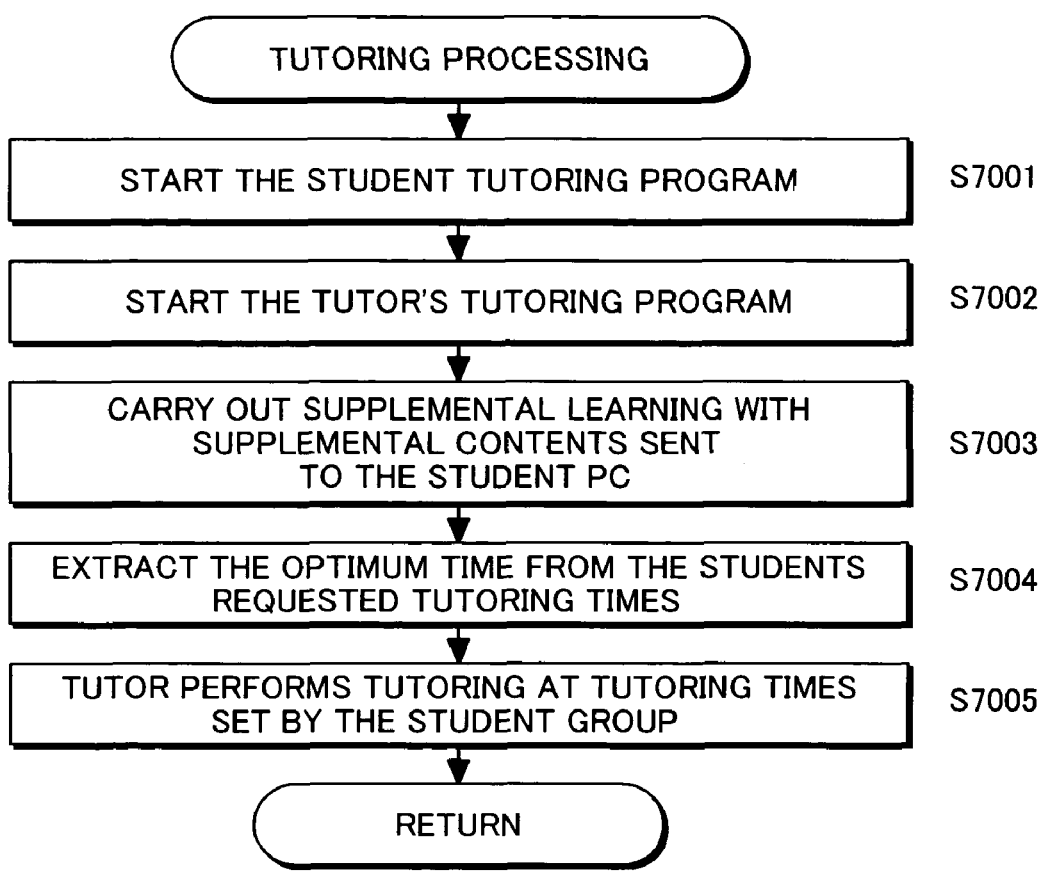
FIG. 16 is a flow chart showing in detail tutoring processing.

The tutoring process (S107 of FIG. 7) is described in detail next while referring to the flow chart of FIG. 16.

First of all, the student PC 103 starts up the student tutoring program 103203 (S7001). The tutor PC 102 starts up the instructor tutoring program 102203 (S7002). The tutor (The instructor may also be the tutor.) performs the tutoring by using the instructor tutoring program 102203 while monitoring the state of the group of students undergoing tutoring and the respective progress of each group's student as displayed on the tutor PC 102. Video images and voices of all students comprising the group can be sent and received and tutoring performed of the group by the tutor in real time by selecting the displayed group.

The tutoring program 103203 simultaneously sends and receives to each group for example by multicasting to groups of student PC 103 from the tutor PC 102.

The student learns from the supplemental learning contents sent to the student PC 103. When the tutoring start time is reached, the student tutoring program 103203 switches the student PC 103 to tutoring mode. The student then receives tutoring in real-time on the (PC) display.

This tutoring start time is determined by calculating an optimum time from the desired tutoring times sent from the respective students making up the students in the tutoring group. An optimum time is then decided and each of the students is notified of this time. When the tutoring start time determined by each student group is reached, the tutor begins tutoring the student group.

The instructor tutoring program run on the tutor PC 102 is described next.

Figure 17:
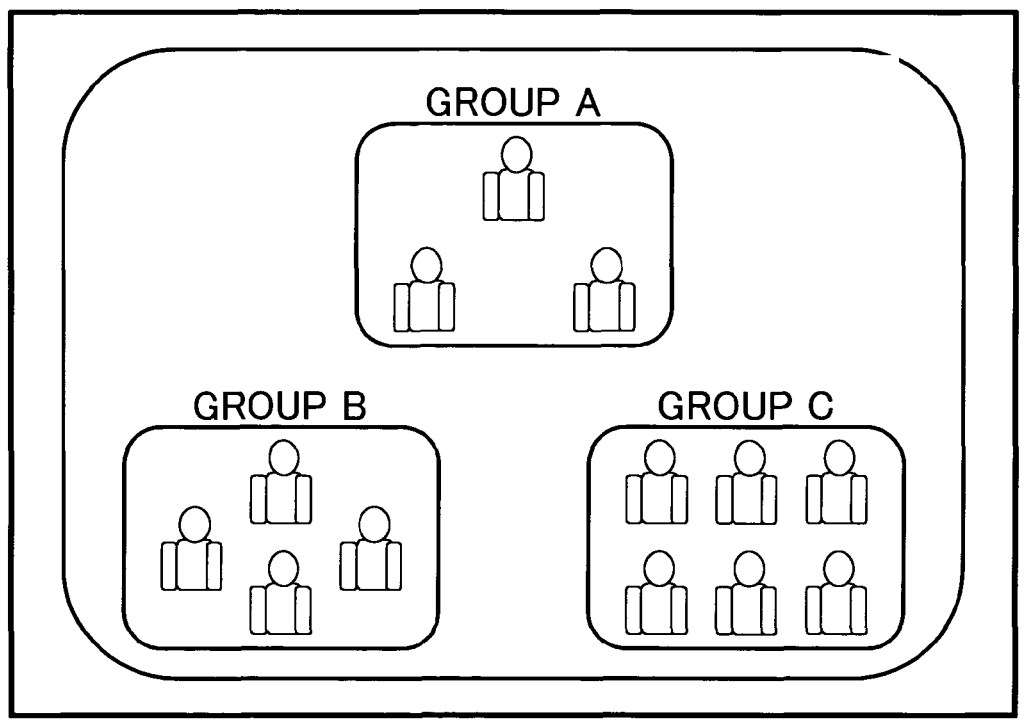
FIG. 17 is a descriptive drawing showing a typical screen display on the tutor PC 102.

FIG. 17 is a descriptive drawing showing a typical screen display on the tutor PC 102.

The students divided up into group as described previously are displayed together in groups. In this case, when separated into the three groups shown in FIG. 17, the moving images or still images filmed on the student PC of the students comprising the three groups, or the face photographs (or information capable of specifying a student such as the name and student No., etc.) of each student of each group stored beforehand, are displayed in the corresponding group. The tutor can view each student by specifying the group name, (here, "Group B").

Figure 18:
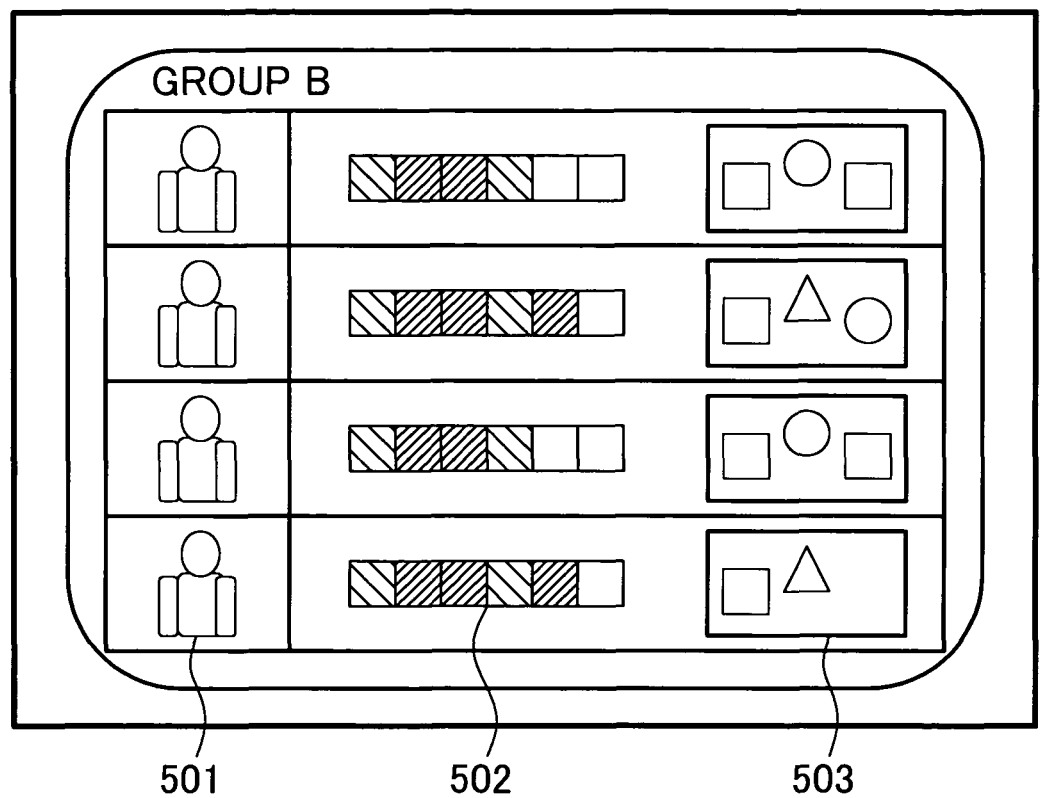
FIG. 18 is a descriptive drawing showing a typical screen display for the student terminal.

FIG. 18 is a drawing showing a typical screen display for the student in the specified "Group B".

The screen is divided up into students, student images 501 filmed by the student PC 103 of each student, a progress display area 502 for displaying to what extent the student has progressed in solving the supplemental learning problem, etc., and a student usage screen 503 for showing a screen of how each student is utilizing the student PC 103. To show progress status, the reply from the student is sent to the instructional management server 101, and at the point the true-false judgment is made, the progress status is created or is rewritten. Each time the student solves an exercise problem, that information is sent to the instructional server 101 from the student PC 103, and the progress information may be created or changed.

The moving images or still image of the instructor or tutor captured by the microphone 10203 and camera 10202 housed in the tutor PC 102, as well as the contents currently being learned, are displayed as basic sub-contents on each student PC 103. To ensure an interactive dialog among the students, the moving images or still images of other students captured by the microphone 10303 and the camera 10302 housed in the student PC 103 of each student making up the group can be displayed as group expression data.

The tutor (or instructor) can perform tutoring swiftly as needed by carrying out an interactive dialog with each student in real-time by way of the instructor tutoring program 102203.

The distribution system of the present invention as described above can extract matching words from integrated data with time stamp created along a timeline from video data, audio data and digital board data written on a digital board (and filmed) in the classroom, by comparing them with words prepared beforehand in a word dictionary. Further, the specified word information can be extracted from the student class learning material and review problems, and video frame data matching review problems linked to a review problem number (No.) can be created.

Also, video frame data for review problems where the student gave a wrong reply, can automatically be sent based on true-false judgments of the reply from the student. The student can therefore review problems where an error was made.

Further, by grouping the students who made mistakes in the same review problems points into groups according to the true-false judgment results of each student's answers, the appropriate tutoring can be given to each group.

The distribution system of the present invention can therefor be employed in instructional content distribution systems for business schools and cram schools providing E-learning using satellite communication, TV telephone, or ASP, etc.

The present invention can make learning efficient because the section student needs to study can be extracted from among all the moving images and the student need only learn those review contents.

The class contents can be recognized (found) with high accuracy using text information extracted from drawing information, audio information and text information obtained from the video information. The user (student) can therefore select the appropriate required section.

By creating review contents that link information relating to course contents (for example, hints and advice) with the associated lecture contents, not only can videos just for the required learning points be extracted but other related information can simultaneously be learned as well. The learning efficiency of the student can in this way be enhanced.

Further, by separating the students into groups according to their replies to exercise (or drill) problems from many student, the students can be communicated with as groups. The teacher can therefore select a particular group on the PC screen and simultaneously tutor the students of that group. There is therefore no need for the teacher to himself setup communications for scheduling tutoring and the man hours required for tutoring can be reduced.

By displaying the results of each group separately on the instructor's terminal, the student benefits because the time required by the student for tutoring can be shortened, and the instructor benefits because the same tutoring can be performed for multiple students, and the tutoring time is used more efficiently.

What is claimed is:

1. An information management server, including a non-transitory computer readable medium, having instructions stored thereon that are executable by a processor to distribute lecture course contents to a student terminal connected to the information management server, the information management server comprising:
   an accumulator section to accumulate electronic data on said lecture contents;
   a holding section to hold lecture-related information including plural problems relating to the lecture contents;
   a send section to send said lecture contents and said lecture-related information to said student terminal;
   an analyzer section to analyze said lecture-related information and electronic data on said lecture contents;
   a matcher section to link said lecture-related information with said lecture contents based on said analysis results; and
   a control section for selecting lecture contents linked to said lecture related information based on a reply to said lecture-related contents sent from said student terminal,
   wherein said send section sends said lecture-related information to the student terminal,
   wherein the analyzer section is configured to extract text information from said lecture information, extract text information from video information contained in said lecture contents, and extract text information from audio information contained in said lecture contents,
   wherein said matcher section links said video information with said lecture-related information based on results from comparing with said extracted text information,
   wherein said analyzer section is configured to add time information relating to lecture contents to the extracted text information per sentence,
   wherein said matcher section is configured to extract words from said extracted text information, extract time information on word locations where specified words frequently appear in said extracted text information, extract said video information corresponding to said specified words in each sentence with said time information, extract said audio information corresponding to said specified words in each sentence with said time information, and store said extracted time information, said extracted video information and said extracted audio information in a relationship collating to each other on a time axis in time-spans during each of which the specified words frequently appear in said extracted text information,
   wherein said control section is configured to select supplemental learning contents to be sent among lecture contents linked with each of said problems included in said lecture related information based on true-false judgment results of replies to each of said problems included in said lecture related information sent from said student terminal, and
   wherein said send section is configured to send said selected supplemental learning contents to the student terminal which sends said replies to each of said problems.

2. An information management server according to claim 1, further comprising a grouping section for sorting students into groups based on replies to said lecture-related contents, wherein said grouping section determines a tutoring start time by calculating an optimum time from desired tutoring times sent from the respective students included in the group, said grouping section extracts a reply source terminal from each of the replies to said lecture-related contents, and sorts said students into groups based on a relation of said source terminal to said students as determined by the determining and extracting functions of said grouping section.

3. An information management server according to claim 1, wherein said matcher section compares a time span start time and a time span end time of each of said time-spans of said extracted video information and said extracted audio information, finds overlaps among said time spans, sets an overlap flag for each overlap among said time-spans, stores said overlap flag with said extracted video and audio information as overlap flag data, searches within said overlap flag data for a hit word contained in an instructional material and review problem contents, finds overlap flag data containing the hit word, and creates review problems based upon found overlap flag data containing the hit word.

4. An information management server, including a non-transitory computer readable medium, having instructions stored thereon that are executable by a processor to distribute lecture course contents to a student terminal connected to the information management server, the information management server comprising:

an accumulator section to accumulate electronic data on said lecture contents;

a holding section to hold lecture-related information including plural problems relating to the lecture contents;

a send section to send said lecture contents and said lecture-related information to said student terminal;

an analyzer section to analyze said lecture-related information and electronic data on said lecture contents;

a matcher section to link said lecture-related information with said lecture contents based on said analysis results; and a control section for selecting lecture contents linked to said lecture related information based on a reply to said lecture-related contents sent from said student terminal, wherein said send section is configured to send said lecture-related information to the student terminals, wherein the analyzer section is configured to extract text information from said lecture-related information, extract text information from video information contained in said lecture contents, and extract text information from audio information contained in said lecture contents, wherein said matcher section links said video information with said lecture-related information based on results from comparing with said extracted text information, wherein said analyzer is configured to add time information relating to lecture contents to the extracted text information per sentence, wherein said matcher section is configured to extract words from said extracted text information, extract time information on word locations where specified words frequently appear in said extracted text information, extract said video information corresponding to said specified words in each sentence with said time information, and extract said audio information corresponding to said specified words in each sentence with said time information, wherein said control section selects lecture contents to be sent among lecture contents linked with each of said problems included in said lecture-related information based on true-false judgment results of replies to each of said problems included in said lecture-related information sent from said student terminal, and wherein said control section is configured to extract sections of video frame data contained in said selected lecture contents and within time-spans during each of which the specified words frequently appear in said extracted text information, and create supplemental learning contents based upon said sections of video frame data to send to said student terminal.

5. An information management server according to claim 4, further comprising a grouping section for sorting students into groups based on replies to said lecture-related contents, wherein said grouping section determines a tutoring start time by calculating an optimum time from desired tutoring times sent from the respective students included in the group, said grouping section extracts a reply source terminal from each of the replies to said lecture-related contents, and sorts said students into groups based on the inclusive relation of said source terminal.

6. An information management server, including a non-transitory computer readable medium, having instructions stored thereon that are executable by a processor to distribute lecture course contents to a student terminal connected to the information management server, the information management server comprising:

an accumulator section to accumulate electronic data on said lecture contents;

a holding section to hold lecture-related information including plural problems relating to the lecture contents;

a send section to send said lecture contents and said lecture-related information to said student terminal;

an analyzer section to analyze said lecture-related information and electronic data on said lecture contents;

a matcher section to link said lecture-related information with said lecture contents based on said analysis results; and a control section for selecting lecture contents linked to said lecture related information based on a reply to said lecture-related contents sent from said student terminal, wherein the analyzer section is configured to extract text information from said lecture-related information, extract text information from video information contained in said lecture contents, and extract text information from audio information contained in said lecture contents, wherein said matcher section is configured to link said video information with said lecture-related information based on results from comparing with said extracted text information, wherein said analyzer section is configured to add time information relating to lecture contents to the extracted text information per sentence, wherein said matcher section is configured to extract words from said extracted text information, extract time information on word locations where specified words frequently appear in said extracted text information, extract said video information corresponding to said specified words in each sentence with said time information, extract said audio information corresponding to said specified words in each sentence with said time information, and store said extracted time information, said extracted video information and said extracted audio information in a relationship collating to each other on a time axis in time-spans during each of which the specified words frequently appear in said extracted text information, wherein said control section is configured to select supplemental learning contents to be sent among lecture contents linked with each of said problems included in said practice problems based on true-false judgment results of replies to each of said practice problems sent from said student terminal, and wherein said control section is configured to extract sections of video frame data contained in said selected lecture contents and within time-spans during each of which the specified words frequently appear in said extracted text information, and create supplemental learning contents based upon said sections of video frame data to send to said student terminal.

7. An information management server according to claim 6, further comprising a grouping section for sorting students into groups based on replies to said lecture-related contents, wherein said grouping section determines a tutoring start time by calculating an optimum time from desired tutoring times sent from the respective students included in the group, said grouping section extracts a reply source terminal from each of the replies to said lecture-related contents, and sorts said students into groups based on a relation of said source terminal to said students as determined by the determining and extracting functions of said grouping section.

8. An information management server according to claim 6, wherein said matcher section compares a time span start time and a time span end time of each of said time-spans of said extracted video information and said extracted audio information, finds overlaps among said time spans, sets an overlap flag for each overlap among said time-spans, stores said overlap flag with said extracted video and audio information as overlap flag data, searches within said overlap flag data for a hit word contained in an instructional material and review problem contents, finds overlap flag data containing the hit word, and creates review problems based upon found overlap flag data containing the hit word.

* * * * *